(12) United States Patent
Blanchard

(10) Patent No.: US 8,656,799 B2
(45) Date of Patent: Feb. 25, 2014

(54) TRANSMISSION DEVICE BETWEEN AN INPUT DRIVE SHAFT AND AN OUTPUT SHAFT, SUCH AS THE SHAFT FOR DRIVING THE WHEELS OF A TRAVELLING MACHINE

(75) Inventor: Robert Blanchard, Le Boupere (FR)

(73) Assignee: France Reducteurs, Les Herbiers (FR)

( * ) Notice: Subject to any disclaimer, the term of this patent is extended or adjusted under 35 U.S.C. 154(b) by 171 days.

(21) Appl. No.: 13/274,785

(22) Filed: Oct. 17, 2011

(65) Prior Publication Data
US 2012/0096965 A1    Apr. 26, 2012

(30) Foreign Application Priority Data
Oct. 25, 2010    (FR) ...................................... 10 58727

(51) Int. Cl.
*F16H 3/08*    (2006.01)

(52) U.S. Cl.
USPC ................................. 74/361; 74/333; 74/355

(58) Field of Classification Search
USPC ........................................... 74/333, 355, 361
See application file for complete search history.

(56) References Cited

U.S. PATENT DOCUMENTS

| 4,094,591 | A | * | 6/1978 | Lafont | .......................... | 359/876 |
| 4,120,486 | A | * | 10/1978 | Mehnert | ....................... | 254/371 |
| 6,565,476 | B1 | * | 5/2003 | Bae | ............................... | 475/320 |
| 7,302,870 | B2 | * | 12/2007 | Vilou et al. | ..................... | 74/7 C |

FOREIGN PATENT DOCUMENTS

| DE | 195 00 046 C1 | 1/1996 |
| FR | 2 867 534 A1 | 9/2005 |
| FR | 2 932 237 A1 | 12/2009 |

OTHER PUBLICATIONS

French Search Report, dated May 12, 2011, from corresponding French application.

* cited by examiner

*Primary Examiner* — Ha D Ho
(74) *Attorney, Agent, or Firm* — Young & Thompson

(57) ABSTRACT

Transmission device between an input drive shaft and an output shaft, of the type including a housing inside which are placed at least partially a reduction gear mechanism and a progressive cone clutch mechanism, the reduction gear mechanism including a driving member engaged with a driven member, formed by a gearwheel mounted so as to rotate freely on the output shaft and able to be coupled to/uncoupled from the output shaft via two friction cones of the clutch mechanism, the cones being placed coaxial to the axial bore of the gearwheel and capable of coming, under the action of a control device, into bearing contact with a conical bearing surface of the gearwheel. The conical bearing surfaces of the gearwheel are, relative to the axis of rotation of the gearwheel, offset axially from the gear teeth of the gearwheel and are placed on the same side of the gear teeth.

19 Claims, 3 Drawing Sheets

TRANSMISSION DEVICE BETWEEN AN INPUT DRIVE SHAFT AND AN OUTPUT SHAFT, SUCH AS THE SHAFT FOR DRIVING THE WHEELS OF A TRAVELLING MACHINE

BACKGROUND OF THE INVENTION

1. Field of the Invention

The present invention relates to a transmission device between an input drive shaft and an output shaft, such as the shaft for driving the wheels of a travelling machine.

2. Description of the Related Art

It relates more particularly to a transmission device comprising a housing, inside which are placed at least partially a reduction gear mechanism and a progressive cone clutch mechanism, the said reduction gear mechanism comprising a driving member engaged with a driven member, the driven member of the reduction gear mechanism being formed by a gearwheel mounted so as to rotate freely on the output shaft and able to be coupled to/uncoupled from the said output shaft by means of the two friction cones of the clutch mechanism, the said cones being placed coaxial to the axial bore of the gearwheel and capable of coming, under the action of a control device, into bearing contact with a conical bearing surface of the gearwheel.

Such transmission devices are well known to those versed in this art. However, the drawback of such a solution lies in the fact that, hitherto, the portion of the wheel furnished with gear teeth and the cones are placed coaxially and concentrically, the face of the gearwheel opposite to the gear teeth being furnished with conical bearing surfaces.

Accordingly, the dimension of the cones, in particular the circumference of the circles forming the base and the truncated apex of the cone, is limited to the diameter of the gearwheel. The result of this is a limitation in the torque that can be transmitted.

SUMMARY OF THE INVENTION

One object of the present invention is to propose a transmission device of the aforementioned type, the design of which makes it possible to pass beyond the diameter of the gearwheel in order to increase the transmitted torque.

Accordingly, the subject of the invention is a transmission device between an input drive shaft and an output shaft, such as the shaft for driving the wheels of a travelling machine, the said device comprising a housing inside which are placed at least partially a reduction gear mechanism and a progressive cone clutch mechanism, the said reduction gear mechanism comprising a driving member engaged with a driven member, the driven member of the reduction gear mechanism being formed by a gearwheel mounted so as to rotate freely on the output shaft and able to be coupled to/uncoupled from the said output shaft by means of the two friction cones of the clutch mechanism, the said cones being placed coaxial to the axial bore of the gearwheel and capable of coming, under the action of a control device, into bearing contact with a conical bearing surface of the gearwheel, characterized in that the conical bearing surfaces of the gearwheel are, relative to the axis of rotation of the gearwheel, offset axially from the gear teeth of the gearwheel and are placed on the same side of the said gear teeth.

The positioning of the clutch cones, no longer in line with or level with the gear teeth of the gearwheel, but offset from the gear teeth of the gearwheel, makes it possible to increase the dimensions of the cones without increasing the dimension of the gear teeth of the gearwheel.

The positioning of the conical bearing surfaces on one and the same side of the wheel plane passing through the gear teeth of the gearwheel makes it possible to place a clutch mechanism with a space requirement that is in particular of reduced width.

Preferably, the gearwheel comprises a tubular basic body and a ring, the said basic body being furnished, on its periphery, with the gear teeth of the gearwheel, the said tubular basic body widening in the direction of one of its ends in order to delimit a shouldered housing for receiving the ring, the said ring comprising internally the two conical bearing surfaces capable of coming into bearing contact with the friction cones housed in the said ring.

Clearly, the ring and the basic body could also have been made as a single part. However, production in two portions simplifies manufacture.

Preferably, the friction cones, hollowed out at the centre so as to be able to be slipped over the output shaft, and rotatably secured to the said output shaft, comprise at least one additional recess, preferably a plurality of additional recesses, around the said central recess. This design lightens the manufacture of the assembly.

Preferably, the peripheral wall of each friction cone connecting the apex and the base of the cone is an axially grooved wall.

By virtue of the presence of these axial grooves which extend from the base towards the apex of the cone, the cones are sure of good lubrication.

Usually the control device comprises a control member, such as a fork, that can be moved angularly with the aid of a control lever about an axis that is substantially perpendicular to the axis of the output shaft in order to clamp or unclamp the friction cones and the conical bearing surfaces.

BRIEF DESCRIPTION OF THE DRAWING FIGURES

The invention will be clearly understood on reading the following description of exemplary embodiments with reference to the appended drawings in which.

DETAILED DESCRIPTION OF THE INVENTION

Figure 1A:
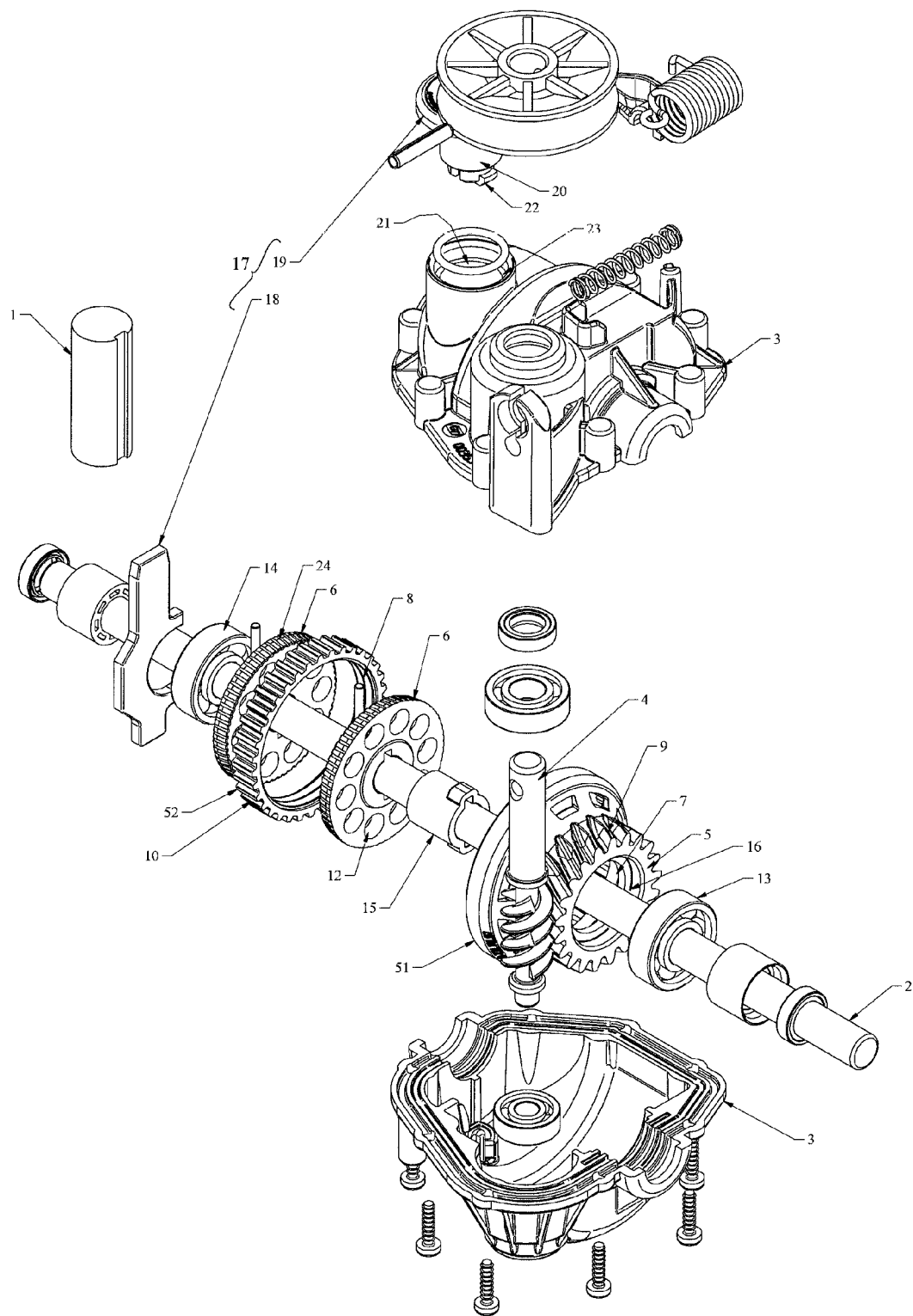
FIG. 1A represents a view in perspective of a transmission device according to the invention in the exploded position of the elements forming it.
Figure 1B:
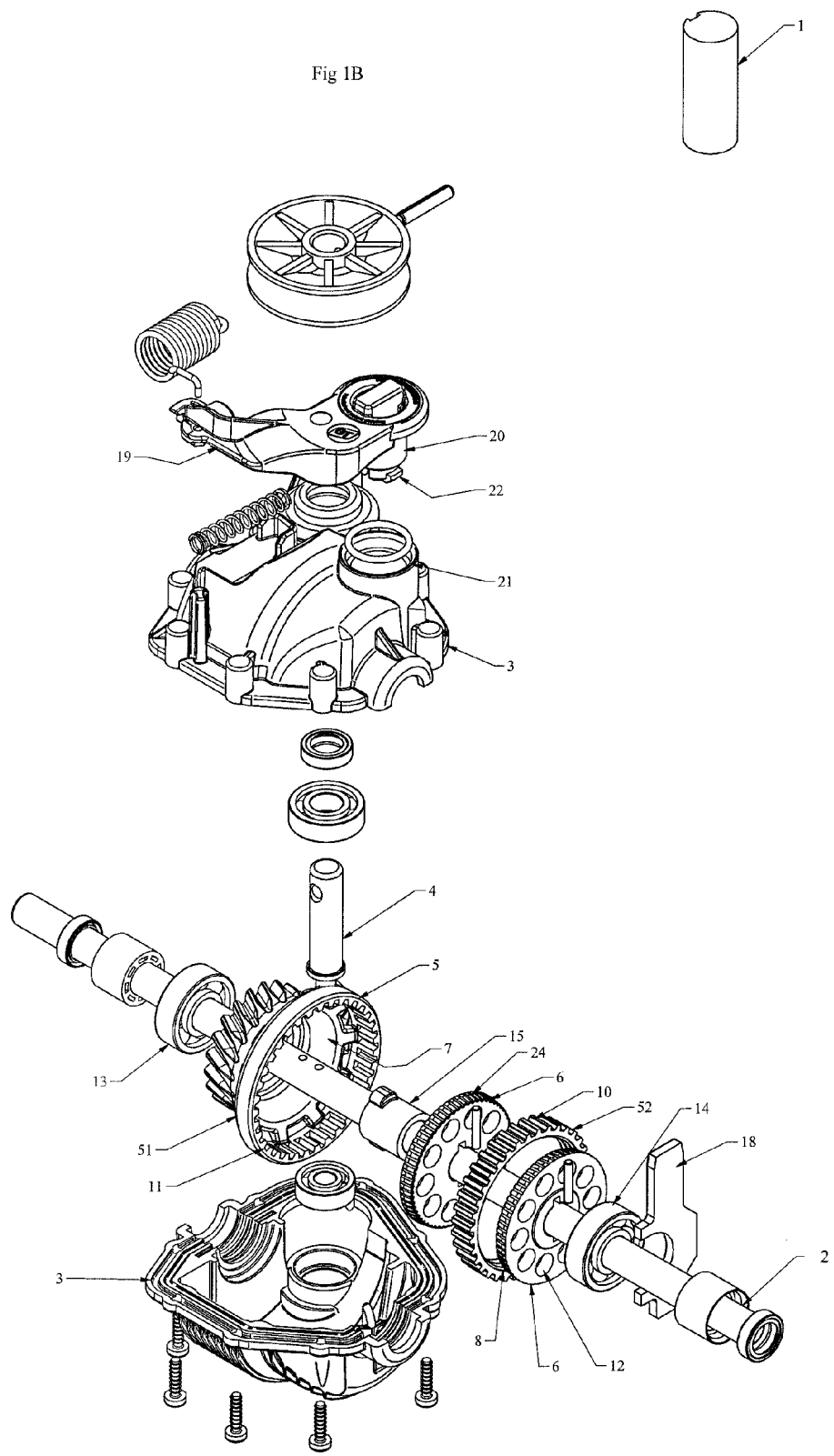
FIG. 1B represents a view in perspective at another angle of the transmission device of FIG. 1A.
Figure 2:
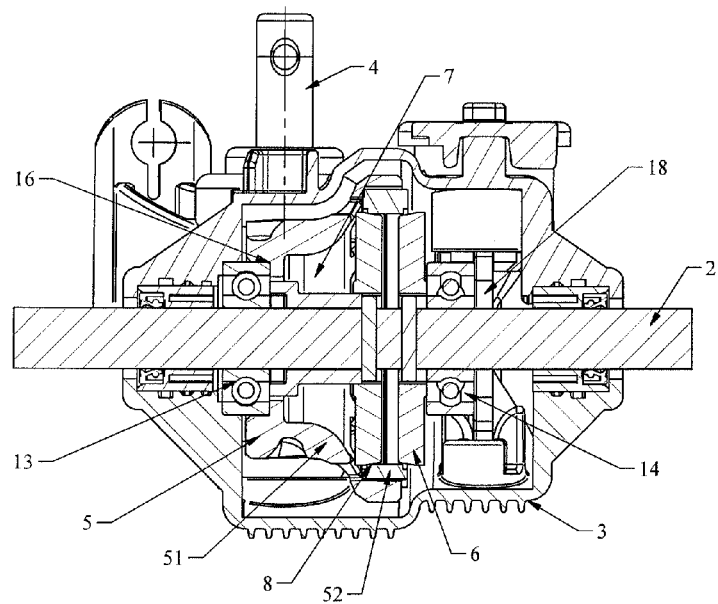
FIG. 2 represents a cross-sectional view of a transmission housing according to the invention.
Figure 3:
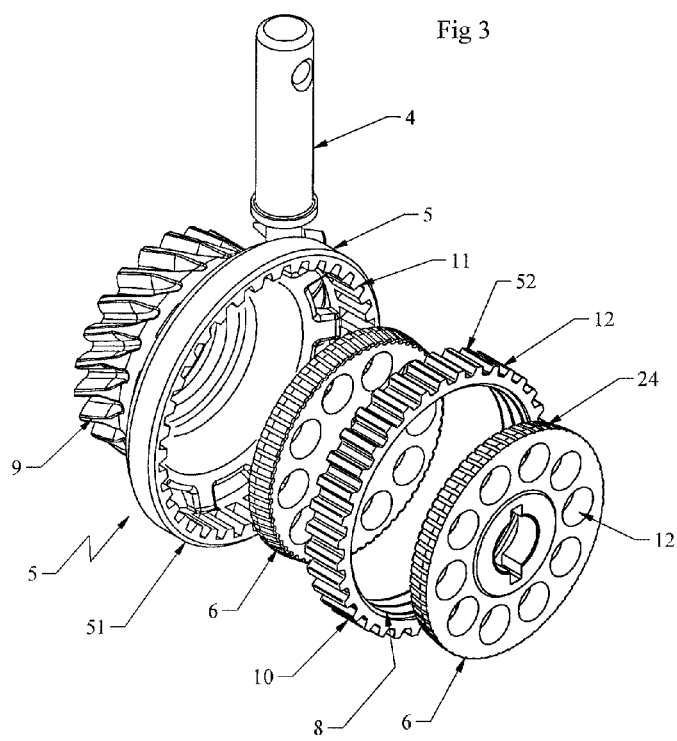
FIG. 3 represents a view in the exploded position of the reduction gear and clutch mechanisms.
Figure 4:
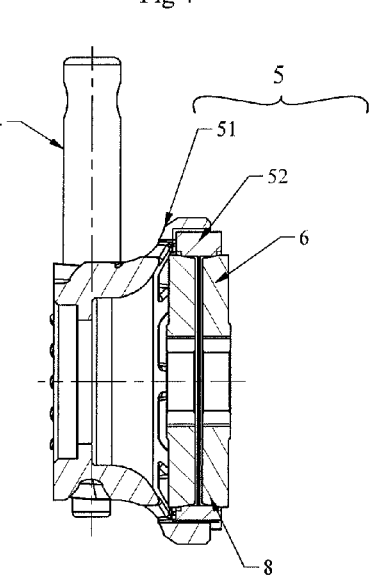
FIG. 4 represents a view in section in the assembled position of the reduction gear and clutch mechanisms.

As mentioned above, the transmission device that is the subject of the invention is more particularly designed for the transmission of movement between an input drive shaft 1 and an output shaft 2, such as the shaft for driving the wheels of a self-propelled travelling machine, in particular of a machine with a walking driver, such as a machine of the lawnmower type, or a machine with an onboard driver, such as a ride-on mower, a golf cart or other machine.

This device comprises a housing 3, usually formed of two half-shells assembled via a parting line. This housing 3 accommodates at least partially a reduction gear mechanism and a progressive cone-friction clutch mechanism 6.

The reduction gear mechanism comprises a driving member 4 such as a worm driven by the input drive shaft 1 via, for example, a belt transmission. This driving member 4 is engaged with a driven member 5 formed of a tangential gearwheel 5 mounted so as to rotate freely on the output shaft 2 and able to be coupled to/uncoupled from the said output shaft by means of the two friction cones 6 of the clutch mechanism placed coaxial with the axial bore 7 of the gearwheel 5 and capable of coming, under the action of a control device 17, into bearing contact with a conical bearing surface 8 of the gearwheel 5.

In a manner characteristic of the invention, the conical bearing surfaces 8 of the gearwheel 5 are, relative to the axis of rotation of the gearwheel 5, offset axially from the gear teeth 9 of the gearwheel 5 and are placed on one and the same side of the said gear teeth 9, in particular, of the wheel plane passing through the said gear teeth.

By virtue of this axial offset between gear teeth and conical bearing surfaces, the conical bearing surfaces can be of a diameter greater than the diameter of the wheel engaged at the gear teeth. This increased dimension of the conical bearing surfaces makes it possible to increase the dimensions of the cones, termed male cones, generally adopting the shape of cone frustums which interact with the conical bearing surfaces and therefore to increase the transmitted torque.

In order to allow such an embodiment, the gearwheel 5 preferably comprises a tubular basic body 51 and a ring 52, the said basic body 51 being furnished, on its periphery, with the gear teeth 9 of the gearwheel 5. The said tubular basic body 51 broadens out in the direction of one of its ends in order to delimit a shouldered housing for receiving the ring 52, the said ring 52 comprising internally the two conical bearing surfaces 8 capable of coming into bearing contact with the friction cones 6 accommodated in the said ring 52.

In the examples shown, the two conical bearing surfaces 8 of the gearwheel 5 have surfaces that diverge from the centre of the bore of the ring 52 towards the outside of the said bore.

The ring 52 therefore has, seen in cross section, a V-shaped internal profile. The ring 52 is rotatably attached to the basic body 51 by meshing, preferably by means of notches 10 or teeth placed on the outer periphery of the ring 52, these notches 10 or teeth engaging with matching notches 11 or teeth made on the inner periphery of the housing for receiving the ring, of the basic body 51.

Thus, in order to attach the ring 52 and the basic body 51, it is sufficient to insert the ring 52 into the housing of the basic body 51 while making sure that the teeth of the external gear teeth of the ring 52 are accommodated in the inter-teeth space of the internal gear teeth of the basic body 51.

Usually, and as illustrated by the figures, the friction cones 6, hollowed out at the centre so as to be able to be slipped over the output shaft 2, and rotatably secured to the said output shaft 2, comprising at least one additional recess 12, preferably a plurality of additional recesses, around the said central recess.

These recesses 12 take the form of a plurality of circular holes distributed around the central recess. In the examples shown, they are ten in number.

In the state in which they are slipped over the output shaft 2, the friction cones 6 are sandwiched between two rolling bearing members 13, 14 with interposition, if necessary, of a spacer 15. One 13 of the rolling bearing members 13, 14 is housed at least partially inside the axial bore 7 of the gearwheel 5 at the gear teeth 9 of the gearwheel 5, this rolling bearing member 13 resting, by one of its faces, against an inner peripheral shoulder 16 of the said axial bore 7.

The peripheral wall of each friction cone 6 connecting the apex and the base of the cone is an axially grooved wall. The grooves 24 connecting the apex and the base of a cone 6 are shown as 24 in the figures.

Each cone is installed, rotatably attached to the output shaft 2, via splines or a pin, and installed so as to be able to move along the said output shaft 2. This output shaft may be formed of only one or of two half-shafts. In this second assumption, each cone is installed so as to be rotatably attached to one half-shaft.

The control device 17 for controlling the clutch mechanism comprises a control member 18, such as a fork, that can be moved angularly with the aid of a control lever 19 about an axis that is substantially perpendicular to the axis of the output shaft 2 in order to clamp or unclamp the friction cones 6 and the conical bearing surfaces 8.

In the examples shown, the control lever 19 for angular movement of the control member 18 is a lever outside the housing, the said lever 19 comprising a sleeve 20 that can be inserted removably into a receiving bearing 21 of the housing 3, the said sleeve 20 being capable, in the state in which it is inserted in the said receiving bearing 21, of being held in at least one predetermined axial position by locking means.

The said locking means between sleeve 20 and bearing 21, in the at least partially inserted state of the sleeve 20 in the said bearing 21, are locking means of the bayonet type formed by at least one, and preferably at least two, unretractable lug(s) 22 and at least one, and preferably at least two, notch(es) 23, the said elements supported respectively without distinction the one(s) by the sleeve 20, the other(s) by the bearing 21, the said locking means being capable of passing from an unlocked position to a locked position in which the or at least one of the lugs 22 of the sleeve, or respectively of the bearing, is engaged with the or at least one of the notches 23 of the bearing, or respectively of the sleeve, by a simple relative rotary movement of the sleeve 20 and of the bearing 21.

Preferably, the sleeve 20 is a slotted sleeve over a portion of its length and makes, between the slots, fingers, a portion of the body of the control member 18 being accommodated, in the assembled state of the housing 3, in the slots made between the said fingers for an angular-movement attachment of the lever 19 and of the control member 18. The or at least two of the fingers are furnished at their free end with an outer radial protrusion forming the lug 22 for locking the sleeve 20 to the bearing 21.

The slotted sleeve comprises, in its zone of connection to the base of the fingers, at least one shoulder butting against a shoulder of the receiving bearing of the housing in the inserted position of the sleeve into the bearing. A seal is interposed between the said shoulders.

The slotted sleeve has two diametrically opposed axial slots inside which one end of the body of the control member consisting of a web of square or rectangular section is inserted so that, in the inserted position, the web of the control member extends in a diametral plane of the sleeve.

The end of the body of the control member, opposite to that accommodated in the receiving bearing of the housing receiving the slotted sleeve, is accommodated inside a bearing of the housing consisting of a cavity with a general shape, for example of a butterfly of which two opposite walls are delimited by convex surfaces connected together by two dihedrons placed so as to form the wings of a butterfly, the ridges of the dihedrons forming the pivot axis of the said control member.

The cavity with a generally butterfly-shaped section is made in one piece with a wall of the half-shell, called the bottom shell, of the housing, that is to say that with no lever.

The control member is, for its part, a fork with two branches. The web of the fork connecting the said branches together being extended axially on either side of the said branches in order to form the sections of rods of square or rectangular section being inserted into the bearings made in each half-shell of the housing.

The angular movement of the said fork with the aid of the control lever 19 therefore makes it possible to clamp or unclamp the friction cones 6 and the conical bearing surfaces 8.

The invention claimed is:

1. A transmission device between an input drive shaft (1) and an output shaft (2), or a shaft for driving the wheels of a travelling machine, comprising:
   a housing (3); and
   a reduction gear mechanism and a progressive cone clutch mechanism (6) placed at least partially in the housing, the reduction gear mechanism comprising
      a driving member (4),
      a driven member (5) engaged with the driving member, and
      a gearwheel (5) forming the driven member (5), the gearwheel being mounted so as to rotate freely on the output shaft (2) and able to be coupled to/uncoupled from the output shaft (2) by means of two friction cones (6) of the clutch mechanism, the cones being placed coaxial to an axial bore (7) of the gearwheel (5) and capable of coming, under action of a control device (17), into bearing contact with a conical bearing surfaces (8) of the gearwheel (5), wherein
   the conical bearing surfaces (8) of the gearwheel (5) are, relative to the axis of rotation of the gearwheel (5), offset axially from gear teeth (9) of the gearwheel (5) and are placed on the same side of the gear teeth (9).

2. The transmission device according to claim 1, wherein the gearwheel (5) comprises a tubular basic body (51) and a ring (52), the basic body (51) being furnished, on its periphery, with the gear teeth (9) of the gearwheel (5), the tubular basic body (51) widening in a direction of one of the tubular basis body's ends in order to delimit a shouldered housing for receiving the ring (52), the ring (52) comprising internally two conical bearing surfaces (8) capable of coming into bearing contact with the friction cones (6) housed in the ring (52).

3. The transmission device according to claim 2, wherein the two conical bearing surfaces (8) of the gearwheel (5) have surfaces that diverge from a centre of a bore of the ring (52) towards an outside of the bore.

4. The transmission device according to claim 2, wherein the ring (52) is rotatably attached to the basic body (51) by meshing.

5. The transmission device according to claim 1, wherein the friction cones (6), hollowed out at a centre so as to be able to be slipped over the output shaft (2), and rotatably secured to the output shaft (2), comprise at least one additional recess (12).

6. The transmission device according to claim 1, wherein the friction cones (6) are sandwiched between two rolling bearing members (13, 14) with interposition, if necessary, of a spacer (15), one (13) of the rolling bearing members (13, 14) being housed at least partially inside the axial bore (7) of the gearwheel (5) at gear teeth (9) of the gearwheel (5), the rolling bearing member (13) resting, by one of its faces, against an inner peripheral shoulder (16) of the axial bore (7).

7. The transmission device according to claim 1, wherein the peripheral wall of each friction cone (6) connecting the apex and the base of the cone is an axially grooved wall.

8. The transmission device according to claim 1, wherein the control device (17) comprises a control member (18), or a fork, that can be moved angularly with aid of a control lever (19) about an axis that is substantially perpendicular to an axis of the output shaft (2) in order to clamp or unclamp the friction cones (6) and the conical bearing surfaces (8).

9. The transmission device according to claim 8, wherein the control lever (19) for angular movement of the control member (18) is a lever outside the housing, the lever (19) comprising a sleeve (20) that can be inserted removably into a receiving bearing (21) of the housing (3), the sleeve (20) being capable, when inserted in the receiving bearing (21), of being held in at least one predetermined axial position by a locking device, the locking device being between the sleeve (20) and the bearing (21), in an at least partially inserted state of the sleeve (20) in an bearing (21), the locking device being a bayonet formed by at least one unretractable lug (22) and at least one notch (23), supported respectively without distinction the one by the sleeve (20), the other by the bearing (21), the locking device being capable of passing from an unlocked position to a locked position in which the or at least one of the lugs (22) of the sleeve, or respectively of the bearing, is engaged with the or at least one of the notches (23) of the bearing, or respectively of the sleeve, by a simple relative rotary movement of the sleeve (20) and of the bearing (21).

10. The transmission device according to claim 9, wherein the sleeve (20) is a slotted sleeve over a portion of its length and makes, between the slots, fingers, a portion of a body of the control member (18) being accommodated, in an assembled state of the housing (3), in the slots made between the fingers for an angular-movement attachment of the lever (19) and of the control member (18), the or at least two of the fingers being furnished at their free end with an outer radial protrusion forming the lug (22) for locking the sleeve (20) to the bearing (21).

11. The transmission device according to claim 3, wherein the ring (52) is rotatably attached to the basic body (51) by meshing.

12. The transmission device according to claim 2, wherein the friction cones (6), hollowed out at a centre so as to be able to be slipped over the output shaft (2), and rotatably secured to the output shaft (2), comprise at least one additional recess (12).

13. The transmission device according to claim 2, wherein the friction cones (6) are sandwiched between two rolling bearing members (13, 14) with interposition, if necessary, of a spacer (15), one (13) of the rolling bearing members (13, 14) being housed at least partially inside the axial bore (7) of the gearwheel (5) at the gear teeth (9) of the gearwheel (5), the rolling bearing member (13) resting, by one of the bearing member's faces, against an inner peripheral shoulder (16) of the axial bore (7).

14. The transmission device according to claim 2, wherein the peripheral wall of each friction cone (6) connecting the apex and the base of the cone is an axially grooved wall.

15. The transmission device according to claim 2, wherein the control device (17) comprises a control member (18), or a fork, that can be moved angularly with the aid of a control lever (19) about an axis that is substantially perpendicular to an axis of the output shaft (2) in order to clamp or unclamp the friction cones (6) and the conical bearing surfaces (8).

16. The transmission device according to claim 2, wherein the ring (52) is rotatably attached to the basic body (51) by meshing by means of notches (10) or teeth placed on an outer periphery of the ring (52), the notches (10) or teeth engaging with matching notches (11) or teeth made on an inner periphery of the housing for receiving the ring, of the basic body (51).

17. The transmission device according to claim 1, wherein the friction cones (6), hollowed out at a centre so as to be able to be slipped over the output shaft (2), and rotatably secured to the output shaft (2), comprise a plurality of additional recesses, around the central recess.

18. The transmission device according to claim 3, wherein the ring (52) is rotatably attached to the basic body (51) by meshing by means of notches (10) or teeth placed on an outer periphery of the ring (52), the notches (10) or teeth engaging with matching notches (11) or teeth made on an inner periphery of the housing for receiving the ring, of the basic body (51).

19. The transmission device according to claim 2, wherein the friction cones (6), hollowed out at a centre so as to be able to be slipped over the output shaft (2), and rotatably secured to the output shaft (2), comprise a plurality of additional recesses, around the central recess.

* * * * *